United States Patent Office 3,282,883
Patented Nov. 1, 1966

3,282,883
ADHESIVE COMPOSITION
William M. De Crease and John H. Shafer, Erie, Pa., assignors to Lord Corporation, a corporation of Pennsylvania
No Drawing. Filed Dec. 2, 1963, Ser. No. 327,503
17 Claims. (Cl. 260—41)

The present invention relates to a novel adhesive composition, and, more particularly, it relates to a novel composition containing chlorsulfonated polyethylene, certain isocyanates and dinitrosobenzene which is capable of standing for long periods of time without gelling and of bonding a wide variety of elastomers, including previously cured elastomers as well as unvulcanized elastomers, together or to other solid substrates.

There have been proposals in the past for preparing adhesives containing chlorsulfonated polyethylene. For example, Patent 3,051,666 discloses an adhesive containing chlorsulfonated polyethylene and either polymethylene-polyphenylisocyanate or 4,4′-methylenedi-o-tolylisocyanate for bonding rubber to metal. Patent 2,854,425 discloses a composition containing a blend of chlorsulfonated polyethylene and polyethylene which is primarily used as a coating composition, although the patent states that it could be used as an adhesive for bonding neoprene and nylon together. This patent also states that there may be included in the composition organic curing agents, such as aromatic and aliphatic diamines, amides, carbamates, cyanates, guanidines, isocyanates, oximes, nitroso compounds, substituted thiazoles, thioamides, thiocarbamates and thioureas. We have found, however, that combining, with chlorsulfonated polyethylene, dinitrosobenzene and the common isocyanates, including those of Patent 3,051,666, results in a system which gels and which is therefore, of limited utility. Moreover, such a system must be used with an uncured elastomer so that curing of the adhesive takes place at the same time as the elastomer being bonded is vulcanized or cured.

It is the principal object of the present invention to provide a novel improved adhesive composition.

It is another object of the invention to provide an adhesive composition that is extremely versatile in being capable of bonding a wide variety of elastomers, including previously cured elastomers, to each other or to a wide variety of other solid substrates.

A further object of the present invention is to provide a novel adhesive composition which in addition to possessing the aforementioned advantageous characteristics, produces bonds having high environmental resistance, for instance resistance to solvents, like acetone, and to corrosive aqueous systems.

Still another object of the present invention is to provide a novel, improved adhesive composition containing chlorsulfonated polyethylene, certain isocyanates and dinitrosobenzene which, in addition to the above-mentioned advantages, does not gel upon standing for prolonged periods of time.

A specific object of the present invention is to provide an adhesive composition capable of bonding bodies of an ethylenepropylene terpolymer to each other or to other solid substrates.

Other objects will become apparent from a consideration of the following specification and the claims.

The novel adhesive composition of the present invention is a solution of chlorsulfonated polyethylene in which are suspended dinitrosobenzene and at least one orthoalkoxy aryl diisocyanate having the formula (1) 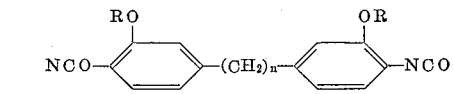

where R is an alkyl group containing from 1 to 3 carbon atoms and where $n$ is selected from the group consisting of 0 and 1, in which the chlorsulfonated polyethylene is present in an amount between about 30 and about 70%, the dinitrosobenzene is present in an amount between about 4 and about 30%, and the orthoalkoxy aryl diisocyanate is present in an amount between about 20 and about 50%, said percentages being by weight based on the weight of the three stated components, and the solids content of the composition being between about 10 and about 40%.

The above-described adhesive composition has many important advantages over past and presently available adhesives. It has marked versatility in bonding virtually all elastomers, except silicones and fluorocarbons, to each other and to other solid substrates. These elastomers include those, like ethylene-propylene terpolymers, which are difficult or impossible to bond with other adhesive systems. Elastomers which may be bonded with the present adhesive composition include the above-mentioned ethylene-propylene terpolymers, such as the terpolymers of ethylene, propylene and a non-conjugated diene, like 1,4-hexadiene, and the terpolymers of ethylene, propylene and dicyclopentadiene; natural rubber; neoprene (G and W types); styrene-butadiene rubber (SBR) including both high and low durometer grades and oil-extended types; butyl rubber; chlorobutyl rubber; butadiene-acrylonitrile rubber, including carboxy-modified types; chlorsulfonated polyethylene rubber; polyurethane rubber, including the castable and millable types; polyacrylate rubber; ethylene-propylene copolymer rubber; and the like. In many cases, the elastomer bonded with the present adhesive may be pre-cured; that is, it need not become cured or vulcanized under relatively high pressures and temperatures during the bonding operation itself. Instead, the elastomer may be vulcanized first and the bonding operation may take place under non-vulcanizing conditions of relatively low pressure and temperature. Other solid substrates which may be bonded with the present adhesive composition include metal, such as steel, aluminum, silver and brass; fabrics; ceramics; plastics; glass, and wood. Bonds produced with the present adhesive possess high environmental resistance, withstanding exposure to many organic liquids and corrosion-inducing aqueous systems. Unlike our experience in attempting to combine chlorsulfonated polyethylene, dinitrosobenzene and isocyanates other than those called for above, in an adhesive composition, the composition of the present invention will not convert to a useless gel upon standing.

Chlorsulfonated polymers of polyethylene are amorphous materials which, by themselves, have little utility as adhesives. They generally contain from about 10 to about 60% (preferably 15 to 45%) of chlorine and from about 0.1 to about 5% (preferably 0.2 to 2.5%) of sulfur. It is believed that most of the chlorine is substituted along the hydrocarbon chain and that the sulfur is combined with the chlorine being attached to the chains as sulfonyl chloride groups. The substitution is believed to be random, and, in a preferred polymer, there is an average of about one chlorsulfonyl group for every 17 carbon atoms. Chlorsulfonated polyethylene polymers are available commercially in various grades differing as to density, molecular weight, and the like. Any one, or mixtures, of these grades may be used. In general it may be said the chlorsulfonated polyethylenes have over 20 carbon atoms and molecular weights over 1000. U.S. Patent 2,405,971 discloses a method of making a chlorsulfonated polyethylene.

The ortho alkoxy aryl diisocyanate will have a formula corresponding to formula I set forth above. The alkoxy groups (RO) will be either methoxy, ethoxy or propoxy. In the presently preferred compound, RO is methoxy. One alkoxy group will also be ortho to each isocyanate group, the latter two groups being in the 4 positions. The two benzene nuclei may be joined together directly, as when $n$ is 0, to provide 3,3'-dimethoxy-4,4'-biphenylene diisocyanate, 3,3'-diethoxy-4,4'-biphenylene diisocyanate or 3,3'-dipropoxy-4,4-biphenylene diisocyanate and such compounds are preferred. However, there may be a methylene group between the benzene nuclei ($n$ is 1) to provide 3,3'-dimethoxy-4,4'-diisocyanato diphenyl methane, 3,3'-diethoxy-4,4'-diisocyanato diphenyl methane or 3,3'-dipropoxy-4,4'-diisocyanato diphenyl methane. The foregoing ortho alkoxy aryl diisocyanates, unlike the common diisocyanates, have been found to provide a stable non-gelling system.

The dinitrosobenzene may be either m- or p-dinitrosobenzene, with the latter being preferred.

In the adhesive composition of the present invention, the chlorsulfonated polyethylene will be present in an amount between about 30 and about 70%; the ortho alkoxy aryl diisocyanate will be present in an amount between about 20 and about 50%, and the dinitrosobenzene will be present in an amount between about 4 and about 30%; these percentages being by weight and based on the combined weight of the three stated materials. Preferred compositions of the present invention will contain between about 40 and about 50% of chlorsulfonated polyethylene; between about 30 and about 40% of ortho alkoxy aryl diisocyanate, and between about 15 and about 20% of dinitrosobenzene.

In preparing the adhesive composition, the chlorsulfonated polyethylene is dissolved in one of the many solvents therefor, which are well known, in which the ortho alkoxy aryl diisocyanate and dinitrosobenzene are substantially insoluble. Such solvents include aromatic hydrocarbons, like benzene, toluene, xylene, and the like; chlorinated hydrocarbons, like trichloroethylene, perchloroethylene, and the like; and combinations thereof, like combinations of an aromatic hydrocarbon and a chlorinated hydrocarbon. The ortho alkoxy aryl diisocyanate and dinitrosobenzene in finely-divided (powder) form are added to the solution and suspended therein. The solids (including chlorsulfonated polyethylene) content of the resulting mixture, will be between about 10 and about 40%, by weight, preferably between about 15 and about 35%.

Various additives, such as fillers, supplemental film-formers, and the like, may be included in the adhesive compositions of the present invention without deleteriously altering the advantageous properties thereof. In fact, the inclusion of a filler may enhance viscosity and other properties desirable from the standpoint of application of the adhesive. Fillers include finely-divided substantially inert solid materials, like carbon black and zinc oxide. The proportion of filler may vary widely from about 15 to about 100%, by weight, based on the combined weight of the chlorsulfonated polyethylene, ortho alkoxy aryl diisocyanate and dinitrosobenzene. A small amount of a supplemental film-former, like chlorinated natural rubber and chlorinated polyvinylchloride, may be included along with the chlorsulfonated polyethylene.

In bonding with the adhesive composition of the present invention, the composition is applied, as by dipping, brushing or spraying, to one or both of the surfaces to be bonded. Where a primer is employed, the adhesive composition may be applied thereover. The adhesive composition, after application is permitted to dry to remove the solvent. This may be done under ambient conditions, that is room temperature, in about 30 to 40 minutes. Solvent evaporation rate can be increased by the use of heat, forced air, or both. Generally, forced drying temperatures should be maintained below 200° F.

The surfaces to be bonded are then brought together with the dried adhesive phase therebetween, and the adhesive cured under heat and sufficient pressure to insure intimate contact of the surfaces being bonded and the adhesive. The adhesive itself can be cured at temperatures ranging from about 250° F. to about 400° F. for a time commensurate with the temperature employed. Thus, at the lower end of the temperature range, curing may require as long as an hour; whereas at the upper end of the range, curing may occur in a matter of minutes. Typical representative curing conditions are 250° F. for 60 minutes, 275° F. for 20 minutes, and 300° F. for 5 minutes. The particular conditions selected may be dictated largely by the materials being bonded. For example, should an unvulcanized elastomer be bonded, in which case vulcanization (or curing) of the elastomer and curing of the adhesive will occur at the same time, conditions suitable for the vulcanization of the elastomer will be selected.

The following examples are given for the purpose of illustration only and are not intended to limit the scope of the invention in any way.

*Example I*

An adhesive is prepared by dissolving 25 parts, by weight, of chlorsulfonated polyethylene (26–29% chlorine; 1.3–1.7% sulfur) in xylene, then adding 20 parts of 3,3'-dimethoxy-4.4'-biphenylene diisocyanate, 10 parts of p-dinitrosobenzene, 10 parts of carbon black and 5 parts of zinc oxide (all parts by weight). The xylene is sufficient to provide a solids content of 20%.

This composition has an apparent viscosity of 400–600 cps. (Brookfield Viscometer, #2 spindle, 30 r.p.m., 25° C.). A sample thereof stored for 56 days at 130° F. shows no evidence of chemical gel formation. The slight physical thickening that does occur is readily eliminated and the material returned to its original viscosity by dilution with xylene and mild agitation. The composition is thixotropic enabling it to be easily applied as a relatively thick, one-coat film without, however, dripping or running.

*Example II*

This example illustrates the versatility of the adhesive composition in bonding a wide variety of elastomers. The elastomers employed, as identified in the following Table I, are compounded according to conventional practice as known to those skilled in the art. The adhesive composition of Example I is applied to steel strips and allowed to dry. The steel strips are then bonded to various unvulcanized elastomers, as set forth in the following Table I, by bringing the steel strip and elastomer together with the adhesive phase between them, and heating under a pressure of approximately 200 p.s.i. at a temperature and for a time as set forth in Table I. Peel adhesion values are then obtained according to ASTM 429–58 Method B modified to a separation angle of 45 degrees (method used in all examples). The values in lb./in are set forth in the following Table I. The table also sets forth the degree of failure in the elastomer itself as compared to the bond line; for example a "Percent Elastomer Retained" of 100 means that all of the failure occurs in the body of elastomer and none at the bond line.

TABLE I

| Elastomer | Peel Adhesion | | Cure Conditions | |
|---|---|---|---|---|
| | Lb./in. | Percent Elastomer Retained | Time (Min.) | Temp. (° F.) |
| Natural rubber (soft) | 55 | 100 | 5 | 307 |
| Styrene-butadiene | 170 | 100 | 30 | 307 |
| Styrene-butadiene (oil extended) | 81 | 100 | 30 | 307 |
| Butyl | 52 | 100 | 30 | 320 |
| Chlorobutyl | 75 | 100 | 12 | 350 |
| Butadiene-acrylonitrile | 108 | 100 | 40 | 307 |
| Butadiene-acrylonitrile (carboxy modified) | 107 | 100 | 10 | 307 |
| Neoprene (GNA) | 141 | 100 | 40 | 307 |
| Neoprene (WRT) | 107 | 100 | 40 | 288 |
| Ethylene-propylene copolymer | 45–55 | 80–100 | 30 | 320 |
| Urethane (castable) | 195 | 93 | 40 | 285 |
| Urethane (millable) | 160 | 90 | 50 | 307 |
| Chlorsulfonated polyethylene ("Hypalon" grade #20 of E. I. du Pont de Nemours Co.) | 83 | 100 | 40 | 307 |
| Chlorsulfonated polyethylene ("Hypalon" grade #40 of E. I. du Pont de Nemours Co.) | 145 | 100 | 40 | 307 |
| Polyacrylate | 42 | 100 | [1] 12 | [1] 340 |

[1] Plus 16 hours at 300° F.

*Example III*

This example illustrates the versatility of the present adhesive in bonding metals. The adhesive composition of Example I is applied to strips of various metals, as set forth in Table II, subject to various common pretreatments for surface preparation, as also set forth in the table and allowed to dry. The strips are then bonded to unvulcanized styrene-butadiene rubber under a pressure of about 200 p.s.i. at 307° F. for 40 minutes. Peel adhesion results in terms of "Percent Elastomer Retained" are set forth in the table.

TABLE II

| Metal | Surface Preparation | Peel Adhesion, Percent Elastomer Retained |
|---|---|---|
| Steel | Degreased (trichlorethylene) | 98 |
| Do | Steel grit blasted | 100 |
| Stainless Steel | Degreased (trichlorethylene) | 100 |
| Do | Al₂O₃ grit blasted | 100 |
| Aluminum | Degreased (trichlorethylene) | 80 |
| Do | Al₂O₃ grit blasted | 99 |
| Brass | Degreased (trichlorethylene) | 80 |
| Silver | do | 97 |
| Steel | Phosphate | 100 |

*Example IV*

This example illustrates the use of the present adhesive in bonding other solid substrates. The adhesive of Example I is applied to various substrates, as set forth in the following Table III, and allowed to dry. The strips are then bonded to unvulcanized natural rubber under a pressure of about 200 p.s.i. at 307° F. for 15 minutes. Under peel adhesion tests, in the cases of wood and polyethylene terephthalate, failure occurs in the body of these materials, and in the case of glass and the plastic laminated sheets, failure occurs in the rubber body, all as set forth in the table.

TABLE III

| Substrate | Peel Adhesion, Percent Elastomer Retained |
|---|---|
| Wood | Substrate failure. |
| Glass | 100. |
| Sheet of resin-impregnated material laminated under high pressure.[1] | 99. |
| Polyethylene terephthalate [2] | Substrate failure. |

[1] "Formica" sheet of Formica Corp.
[2] "Mylar" of E. I. du Pont de Nemours Co.

*Examples V–VIII*

Adhesives are prepared from chlorsulfonated polyethylene, 3,3'-dimethoxy-4,4'-biphenylene diisocyanate and p-dinitrosobenzene with sufficient xylene to provide a total solids content of 30%. The proportions of materials, in parts by weight, in the various compositions are set forth in the following Table IV and the elastomers bonded and the results of peel adhesion tests for each composition set forth in Table V. The natural rubber is bonded at 307° F. for 15 minutes and the butyl rubber is bonded at 320° F. for 30 minutes, and the rubbers are bonded to cold rolled steel which has been degreased in trichorothylene and blasted with steel grit.

TABLE IV

| | V | VI | VII | VIII |
|---|---|---|---|---|
| Chlorsulfonated polyethylene | 45 | 48 | 42.5 | 35 |
| 3,3'-dimethoxy-4,4'-biphenylene diisocyanate | 45 | 48 | 42.5 | 35 |
| p-Dinitrosobenzene | 10 | 4 | 15 | 30 |

TABLE V

| | Peel Adhesion | | | |
|---|---|---|---|---|
| | Natural Rubber | | Butyl Rubber | |
| | Lb./in. | Percent Elastomer Retained | Lb./in. | Percent Elastomer Retained |
| V | 56 | 99 | 90 | 83 |
| VI | 47 | 88 | 108 | 83 |
| VII | 55 | 100 | 95 | 100 |
| VIII | 41 | 100 | 104 | 97 |

*Example IX*

This example illustrates the bonding of elastomer to elastomer, including previously vulcanized elastomers. The adhesive of Example I is used, and other pertinent information is set forth in the following Table VI.

TABLE VI

| Elastomer A | Elastomer B | Cure | | Peel Adhesion,[1] lb./in. |
|---|---|---|---|---|
| | | Time (Min.) | Temp. (° F.) | |
| Unvulcanized terpolymer of ethylene, propylene and a nonconjugated diene. | Vulcanized styrene-butadiene | 25 | 307 | 33 |
| Vulcanized natural rubber | do | 20 | 275 | 38 |
| Vulcanized butyl | Unvulcanized natural rubber | 35 | 307 | 44 |
| Unvulcanized urethane | Unvulcanized neoprene | 15 | 307 | 23 |

[1] In all cases there is 100% failure in the elastomer body and none at the bond line.

*Example X*

An adhesive is prepared by dissolving 25 parts, by weight, of chlorsulfonated polyethylene (26–29% chlorine; 1.3–1.7% sulfur) in xylene, then adding 20 parts of 3,3'-dimethoxy-4,4'-diisocyanato diphenylmethane, 10 parts of p-dinitrosobenzene, 10 parts of carbon black and 5 parts of zinc oxide (all parts by weight). The xylene is sufficient to provide a solids content of 20%.

This adhesive is applied to grit blasted steel strips and allowed to dry. The steel strips are then bonded to various unvulcanized elastomers, as set forth in the following Table VII, by bringing the steel strip and elastomer together with the adhesive between them, and heating, under a pressure of approximately 200 p.s.i. at a temperature and for a time as set forth in Table VII. Peel adhesion values and degree of failure in the elastomer are obtained as in Example II. The results are tabulated as follows:

TABLE VII

| Elastomer | Peel Adhesion | | Cure Conditions | |
|---|---|---|---|---|
| | Lb./in. | Percent Elastomer Retained | Time (Min.) | Temp. (° F.) |
| Natural Rubber | 52 | 100 | 5 | 307 |
| Styrene-butadiene | 182 | 100 | 30 | 307 |
| Butadiene-acrylonitrile | 112 | 100 | 40 | 307 |
| Neoprene (GNA) | 111 | 100 | 40 | 307 |
| Butyl | 93 | 100 | 30 | 320 |

*Example XI*

An adhesive is prepared by dissolving 68 parts of chlorsulfonated polyethylene (26–29% chlorine; 1.3–1.7% sulfur) in xylene, then adding 22 parts of 3,3'-dimethoxy-4,4'-biphenylene diisocyanate, 10 parts of p-dinitrosobenzene and 15 parts of carbon black (all parts by weight). The xylene is sufficient to provide a solids content of 25%.

This adhesive is applied to grit blasted cold rolled steel strips and allowed to dry. The steel strips are then bonded to unvulcanized natural rubber, at 307° F. for 15 minutes, and to butyl rubber, at 320° F. for 30 minutes. Peel adhesion values and degree of failure in the elastomer are obtained as in Example II. The results are tabulated as follows:

TABLE VIII

| Elastomer | Peel Adhesion | |
|---|---|---|
| | Lb./in. | Percent Elastomer Retained |
| Natural Rubber | 63 | 70 |
| Butyl | 80 | 78 |

Modification is possible in the selection of essential materials and of additives as well as in the relative amounts thereof, without departing from the scope of the present invention.

We claim:

1. An adhesive composition consisting essentially of a solution of chlorsulfonated polyethylene in which are suspended dinitrosobenzene and at least one ortho alkoxy aryl diisocyanate having the formula

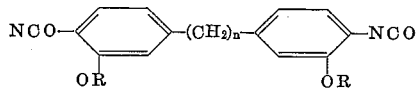

where R is an alkyl group containing from 1 to 3 carbon atoms, and where n is selected from the group consisting of 0 and 1 in which the chlorsulfonated polyethylene is present in an amount between about 30 and about 70%, the dinitrosobenzene is present in an amount between about 4 and about 30%, and the ortho alkoxy aryl diisocyanate is present in an amount between about 20 and about 50%, said percentages being by weight based on the weight of the three stated ingredients, and the solids content of the composition being between about 10 and about 40%.

2. The composition of claim 1 wherein said dinitrosobenzene is p-dinitrosobenzene.

3. The composition of claim 1 wherein n is 0.

4. The composition of claim 1 wherein R is methyl.

5. The composition of claim 1 wherein said ortho alkoxy aryl diisocyanate is 3,3'-dimethoxy-4,4'-biphenylene diisocyanate.

6. The composition of claim 1 containing also an inert, finely-divided filler.

7. The composition of claim 6 wherein said filler is selected from the group consisting of carbon black and zinc oxide.

8. The composition of claim 1 wherein said dinitrosobenzene is p-dinitrosobenzene, and wherein said ortho alkoxy aryl diisocyanate is 3,3'-dimethoxy-4,4'-biphenylene diisocyanate.

9. The composition of claim 1 wherein said ortho alkoxy aryl diisocyanate is 3,3'-dimethoxy-4,4'-diisocyanato diphenylmethane.

10. An adhesive composition consisting essentially of a solution of chlorsulfonated polyethylene in which are suspended dinitrosobenzene and at least one ortho alkoxy aryl diisocyanate having the formula

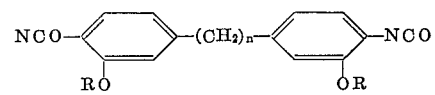

where R is an alkyl group containing from 1 to 3 carbon atoms, and where n is selected from the group consisting of 0 and 1, in which the chlorsulfonated polyethylene is present in an amount between about 40 and about 50%, the dinitrosobenzene is present in an amount between about 15 and about 20%, and the ortho alkoxy aryl diisocyanate is present in an amount between about 30 and about 40%, said percentages being by weight based on the weight of the three stated ingredients, and the solids content of the composition being between about 15 and about 35%.

11. The composition of claim 10 wherein said dinitrosobenzene is p-dinitrosobenzene.

12. The composition of claim 10 wherein n is 0.

13. The composition of claim 10 wherein R is methyl.

14. The composition of claim 10 wherein said ortho alkoxy aryl diisocyanate is 3,3'-dimethoxy-4,4'-biphenylene diisocyanate.

15. The composition of claim 10 containing also an inert, finely-divided filler.

16. The composition of claim 15 wherein said filler is selected from the group consisting of carbon black and zinc oxide.

17. The composition according to claim 10 wherein said ortho alkoxy aryl diisocyanate is 3,3'-dimethoxy-4,4'-diisocyanato diphenylmethane.

References Cited by the Examiner

UNITED STATES PATENTS 2,854,425   5/1955   Boger et al. _____ 260—33.6
3,051,666   11/1958  Snodden _____ 260—3.5

OTHER REFERENCES

Rehner, Jr., et al., "Industrial and Engineering Chemistry," 38: 500–506 (1946).

Skeist, Handbook of Adhesives, Reinhold, New York, 1962, pp. 339–40, 342 relied on.

MORRIS LIEBMAN, *Primary Examiner.*

J. S. WALDRON, *Assistant Examiner.*